United States Patent
Yu et al.

(10) Patent No.: US 10,100,766 B2
(45) Date of Patent: Oct. 16, 2018

(54) APPARATUS AND METHOD FOR CONTROLLING AN ENGINE

(71) Applicant: DOOSAN INFRACORE CO., LTD., Incheon (KR)

(72) Inventors: Jin-Hwan Yu, Incheon (KR); Chung-Min Kim, Incheon (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 9 days.

(21) Appl. No.: 15/315,384

(22) PCT Filed: Jun. 2, 2015

(86) PCT No.: PCT/KR2015/005542
§ 371 (c)(1),
(2) Date: Dec. 1, 2016

(87) PCT Pub. No.: WO2015/186957
PCT Pub. Date: Dec. 10, 2015

(65) Prior Publication Data
US 2017/0198654 A1    Jul. 13, 2017

(30) Foreign Application Priority Data

Jun. 2, 2014 (KR) .......................... 10-2014-0066885

(51) Int. Cl.
*F02D 45/00* (2006.01)
*F02D 41/06* (2006.01)
(Continued)

(52) U.S. Cl.
CPC .............. *F02D 41/04* (2013.01); *F01M 11/10* (2013.01); *F01P 11/16* (2013.01); *F02D 35/00* (2013.01);
(Continued)

(58) Field of Classification Search
CPC .... F02D 41/04; F02D 41/0007; F02D 41/064; F02D 41/222; F02D 41/22; F02D 45/00;
(Continued)

(56) References Cited

U.S. PATENT DOCUMENTS 5,070,832 A * 12/1991 Hapka ...................... F01M 1/22
                                                        123/198 D
6,415,761 B1 * 7/2002 McKenzie ............... F01P 11/16
                                                        123/198 D (Continued)

FOREIGN PATENT DOCUMENTS

EP      2 971 711 A1    1/2016
JP      H04-303128 A    10/1992
(Continued)

OTHER PUBLICATIONS

International Search Report dated Aug. 26, 2015 for PCT/KR2015/005542.

(Continued)

*Primary Examiner* — Lindsay Low
*Assistant Examiner* — George Jin
(74) *Attorney, Agent, or Firm* — Hauptman Ham, LLP (57) ABSTRACT

An engine control apparatus includes a temperature sensor configured to detect engine-related temperature information, a first calculator configured to calculate a first limit output value of an engine based on the temperature information inputted from the temperature sensor, an oil pressure sensor configured to detect a pressure of engine oil, a second calculator configured to calculate a second limit output value of the engine based on the oil pressure inputted from the oil pressure sensor, and a determiner configured to determine one of the first and second limit output values inputted from the first and second calculators as an optimal limit output value of the engine.

14 Claims, 6 Drawing Sheets

(51) Int. Cl.
*F02D 41/04* (2006.01)
*F01M 11/10* (2006.01)
*F02D 35/00* (2006.01)
*F01P 11/16* (2006.01)
*F02D 35/02* (2006.01)

(52) U.S. Cl.
CPC ......... *F02D 35/025* (2013.01); *F02D 41/064* (2013.01); *F02D 45/00* (2013.01); *F02D 2200/021* (2013.01); *F02D 2250/26* (2013.01)

(58) Field of Classification Search
CPC ............. F02D 2001/0075; F02D 35/00; F02D 2200/021; F02D 2200/024; F02D 2200/10; F02D 2200/1002; F02D 2250/26; F01M 11/10; F01P 11/16; F02B 37/013; F02B 37/004; F02M 26/08; B60W 10/06
See application file for complete search history.

(56) References Cited

U.S. PATENT DOCUMENTS

| | | | |
|---|---|---|---|
| 9,828,925 B2 | 11/2017 | Slaton et al. | |
| 2004/0112332 A1* | 6/2004 | Kang | B60W 10/06 123/350 |
| 2008/0133116 A1 | 6/2008 | Mischler et al. | |
| 2011/0106414 A1 | 5/2011 | Leanos et al. | |
| 2011/0146622 A1* | 6/2011 | Kadolph | F02B 37/013 123/350 |
| 2012/0067327 A1 | 3/2012 | Kaiser et al. | |
| 2014/0277995 A1* | 9/2014 | Slaton | F01N 11/00 701/102 |
| 2014/0358401 A1* | 12/2014 | Montgomery | F02D 41/22 701/102 |

FOREIGN PATENT DOCUMENTS

| | | |
|---|---|---|
| JP | 08-312436 A | 11/1996 |
| JP | 2001-041074 A | 2/2001 |
| KR | 20-0286628 Y1 | 11/2002 |
| KR | 10-2009-0062268 A | 6/2009 |

OTHER PUBLICATIONS

The extended European search report dated Jan. 8, 2018 in connection with the counterpart European Patent Application No. 15803253.2.

\* cited by examiner

APPARATUS AND METHOD FOR CONTROLLING AN ENGINE

CROSS REFERENCE TO RELATED APPLICATION

This application is the National Phase application of International Application No. PCT/KR2015/005542, filed Jun. 2, 2015, which is based upon and claims the benefits of priorities under 35 U.S.C § 119(a) of Korean Patent Application No. 10-2014-0066885, filed on Jun. 2, 2014 with the Korean Intellectual Property Office (KIPO), the entire contents of which are incorporated herein by reference.

BACKGROUND

1. Field

Example embodiments relate to an engine control apparatus and method. More particularly, example embodiments relate to an apparatus and a method for controlling an engine in a cold driving condition.

2. Description of the Related Art

In an internal combustion engine, engine oil may be used for cooling and lubrication. The engine oil stored in an oil pan may be supplied to a main gallery by an oil pump, and then may be supplied from the main gallery to engine moving parts in order to perform the cooling and lubrication functions. Then, the engine oil may return to the oil pan.

On the other hand, because viscosity of the engine oil rises on cold days in winter, a transfer speed of the oil may decrease, and in the beginning of a cold drive it may take time to supply the oil into an oil circuit, thereby causing a lack of the engine oil. Thus, problems may occur in the moving parts such as a turbocharger which require cooling and lubrication with the engine oil.

SUMMARY

Example embodiments provide an engine control apparatus capable of preventing breakdowns of engine moving parts due to a lack of engine oil in a cold driving condition of an internal combustion engine.

Example embodiments provide a method of controlling an engine of an internal combustion engine using the above-mentioned engine control apparatus.

According to example embodiments, an engine control apparatus includes a temperature sensor configured to detect engine-related temperature information, a first calculator configured to calculate a first limit output value of an engine based on the temperature information inputted from the temperature sensor, an oil pressure sensor configured to detect a pressure of engine oil, a second calculator configured to calculate a second limit output value of the engine based on the oil pressure inputted from the oil pressure sensor, and a determiner configured to determine one of the first and second limit output values inputted from the first and second calculators as an optimal limit output value of the engine.

In example embodiments, the engine-related temperature information may include at least one of an engine oil temperature, an engine block temperature and an engine cooling water temperature.

In example embodiments, the first calculator may receive the engine oil temperature detected in an oil main gallery.

In example embodiments, the second calculator may receive an engine oil pressure detected in an oil main gallery.

In example embodiments, the second calculator may receive an engine oil pressure detected in a turbocharger.

In example embodiments, the first calculator may use an engine torque limit map for the engine-related temperature information to calculate an engine speed-limit torque value with respect to the temperature information.

In example embodiments, the second calculator may use an engine torque limit map for the oil pressure to calculate an engine speed-limit torque value with respect to the oil pressure.

In example embodiments, the engine control apparatus may further include an anticipator configured to predict an oil pressure in the turbocharger based on the inputted oil pressure, and the second calculator may calculate the second limit output value based on the predicted oil pressure in the turbocharger.

In example embodiments, the second calculator may delay the inputted oil pressure value by a predetermined time to calculate the second limit output value of the engine.

In example embodiments, the determiner may determine the minimum value of the first and second limit output values as the optimal output value.

According to example embodiments, in an engine control method, engine-related temperature information is detected. A first limit output value of an engine is calculated based on the temperature information. An oil pressure of the engine is detected. A second limit output value of the engine is calculated based on the oil pressure. One of the first and second limit output values is determined as an optimal limit output value of the engine.

In example embodiments, calculating a second limit output value may include delaying the detected oil pressure value by a predetermined time.

In example embodiments, detecting the engine-related temperature information may include at least one of detecting an engine oil temperature, detecting an engine block temperature and detecting an engine cooling water temperature.

In example embodiments, detecting the oil pressure of the engine may include any one of detecting an engine oil pressure in an oil main gallery and detecting an engine oil pressure in a turbocharger.

In example embodiments, calculating the first limit output value may include using an engine torque limit map for the engine-related temperature information to calculate an engine speed-limit torque value with respect to the temperature information.

In example embodiments, calculating the second limit output value may include using an engine torque limit map for the oil pressure to calculate an engine speed-limit torque value with respect to the oil pressure.

In example embodiments, the engine control method may further include predicting an oil pressure in the turbocharger based on the detected oil pressure, and the second limit output value of the engine may be calculated based on the predicted oil pressure in the turbocharger.

According to example embodiments, an engine control apparatus may limit an engine torque or an engine speed according to an oil temperature, so that an oil pressure drop in an engine due to high viscosity of the oil at low temperatures may be prevented and thus breakdowns of moving parts due to inadequate lubrication may be prevented.

Additionally, the engine torque or the engine speed may be limited until, after cold start, oil is supplied to an oil circuit and an oil pressure in the oil circuit is increased to a desired pressure, to thereby prevent the breakdown of the moving parts due to the inadequate lubrication.

Especially, an oil pressure value of the engine oil supplied into a turbocharger which tends to be easily broken down by inadequate lubrication may be predicted from an oil pressure value of the engine oil detected in an oil main gallery, to thereby prevent the breakdown of the turbocharger.

BRIEF DESCRIPTION OF THE DRAWINGS

Example embodiments will be more clearly understood from the following detailed description taken in conjunction with the accompanying drawings.

DESCRIPTION OF EMBODIMENTS

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this description will be thorough and complete, and will fully convey the scope of the present inventive concept to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, fourth etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
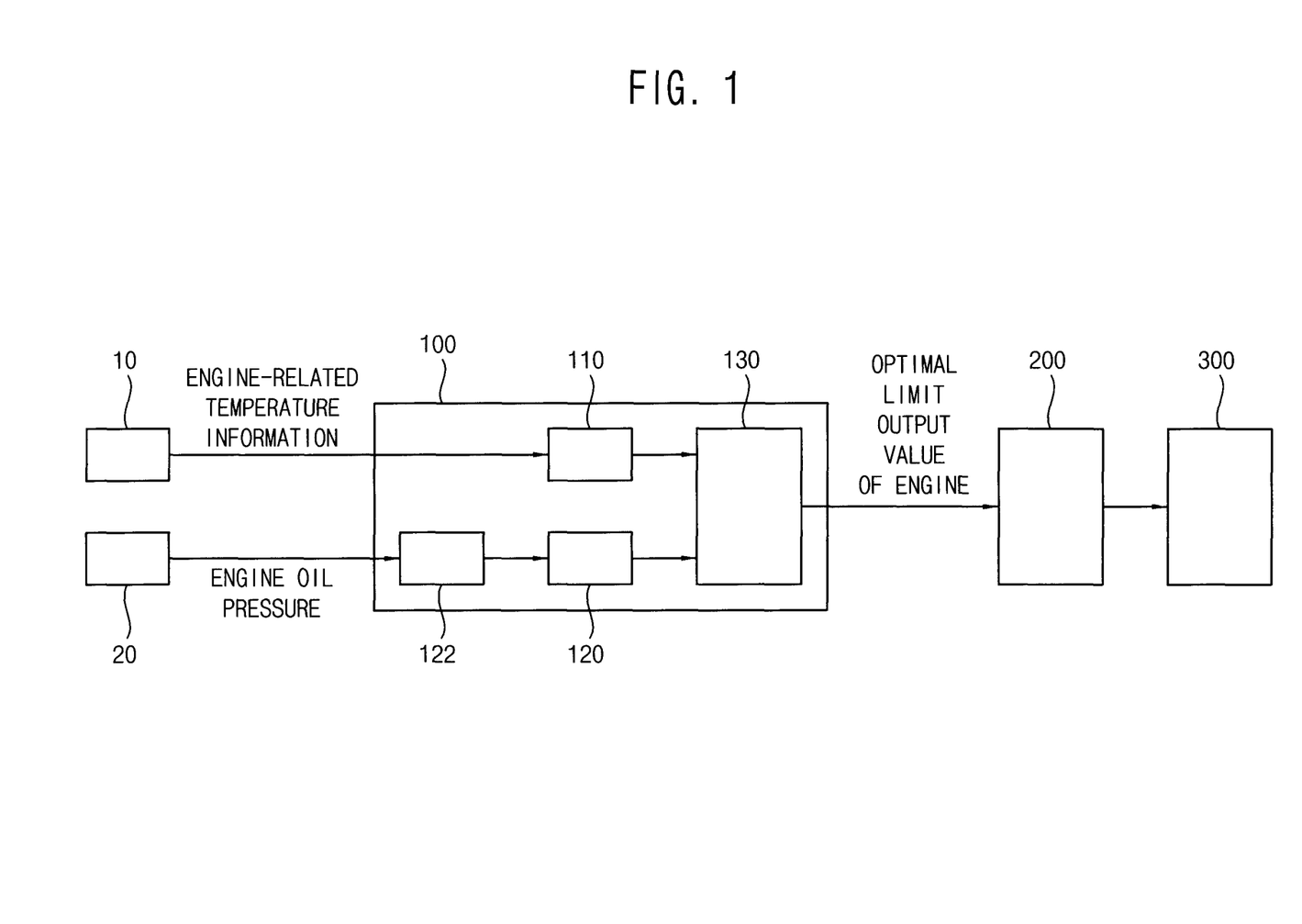
FIG. 1 is a block diagram illustrating an engine control device in accordance with example embodiments.
Figure 2:
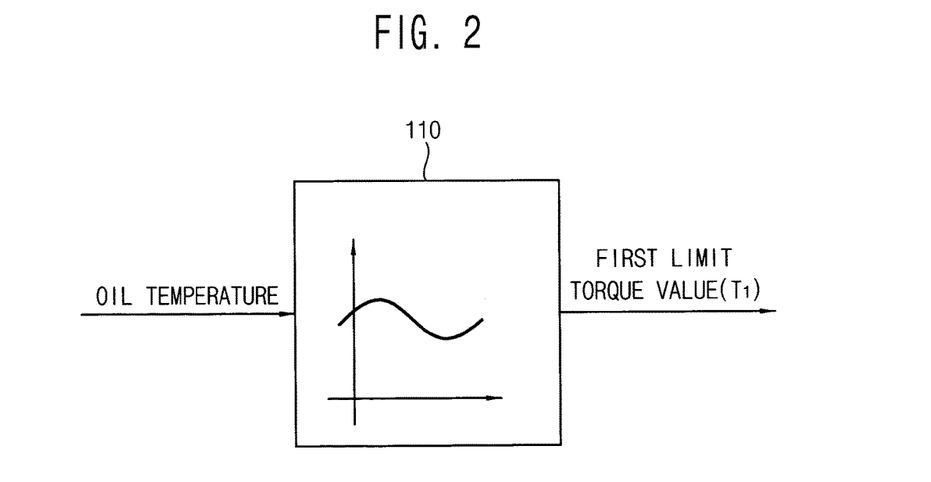
FIG. 2 is a block diagram illustrating a first calculator in FIG. 1.
Figure 3:
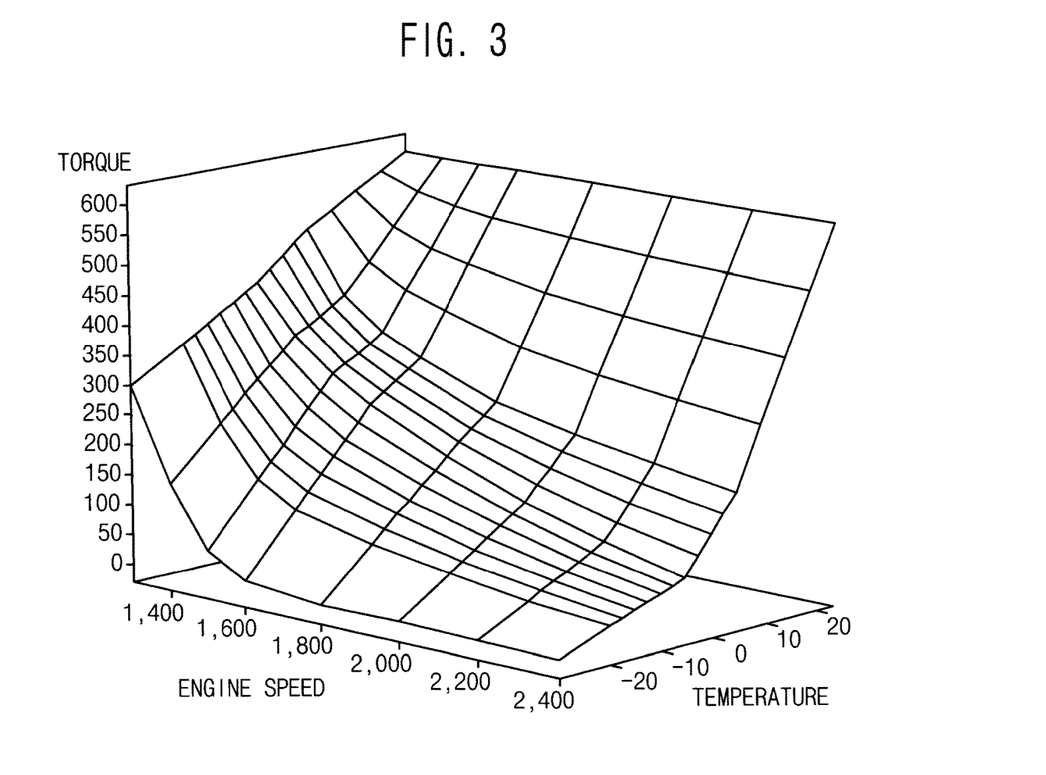
FIG. 3 is a graph illustrating an engine torque limit map with respect to an oil temperature stored in the first calculator in FIG. 2.
Figure 4:
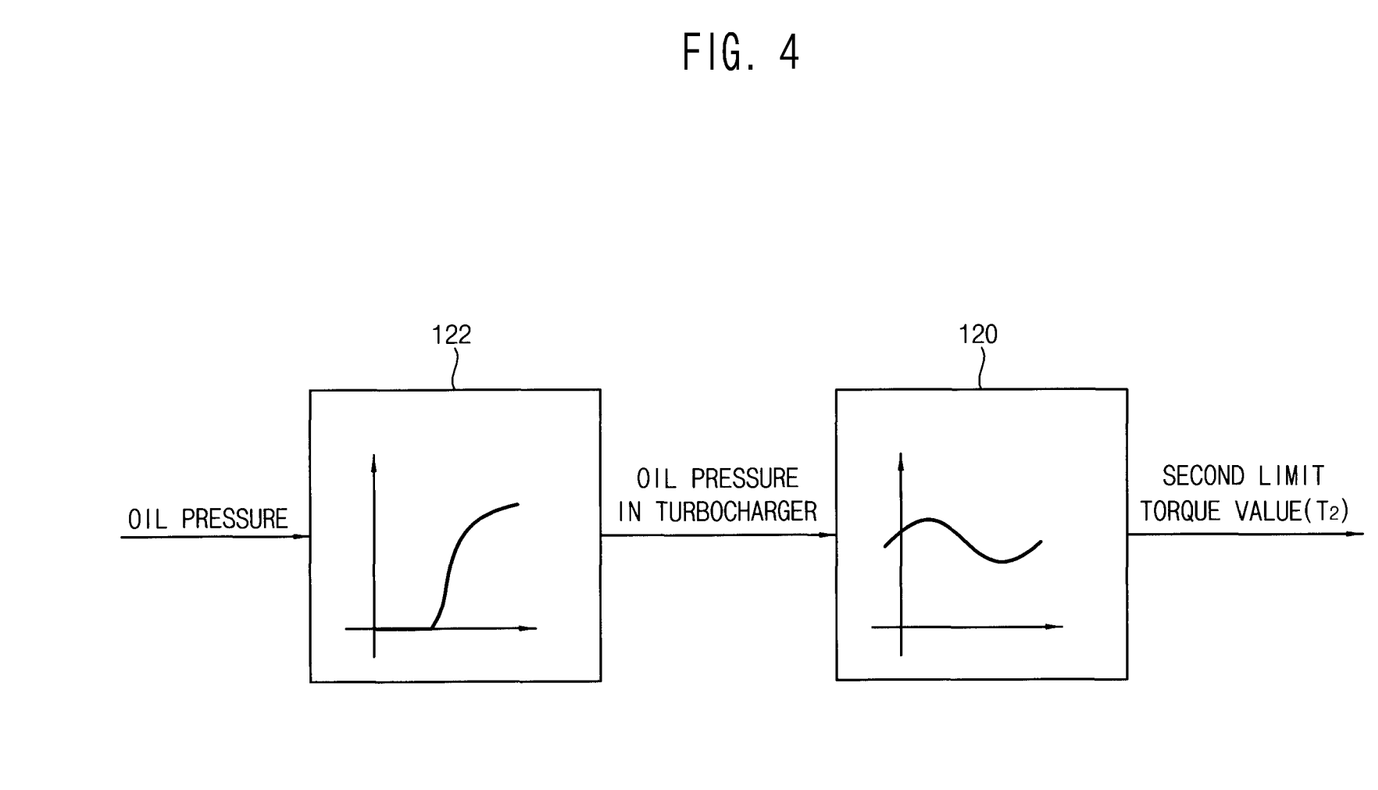
FIG. 4 is a block diagram illustrating an anticipator and a second calculator in FIG. 1.
Figure 5:
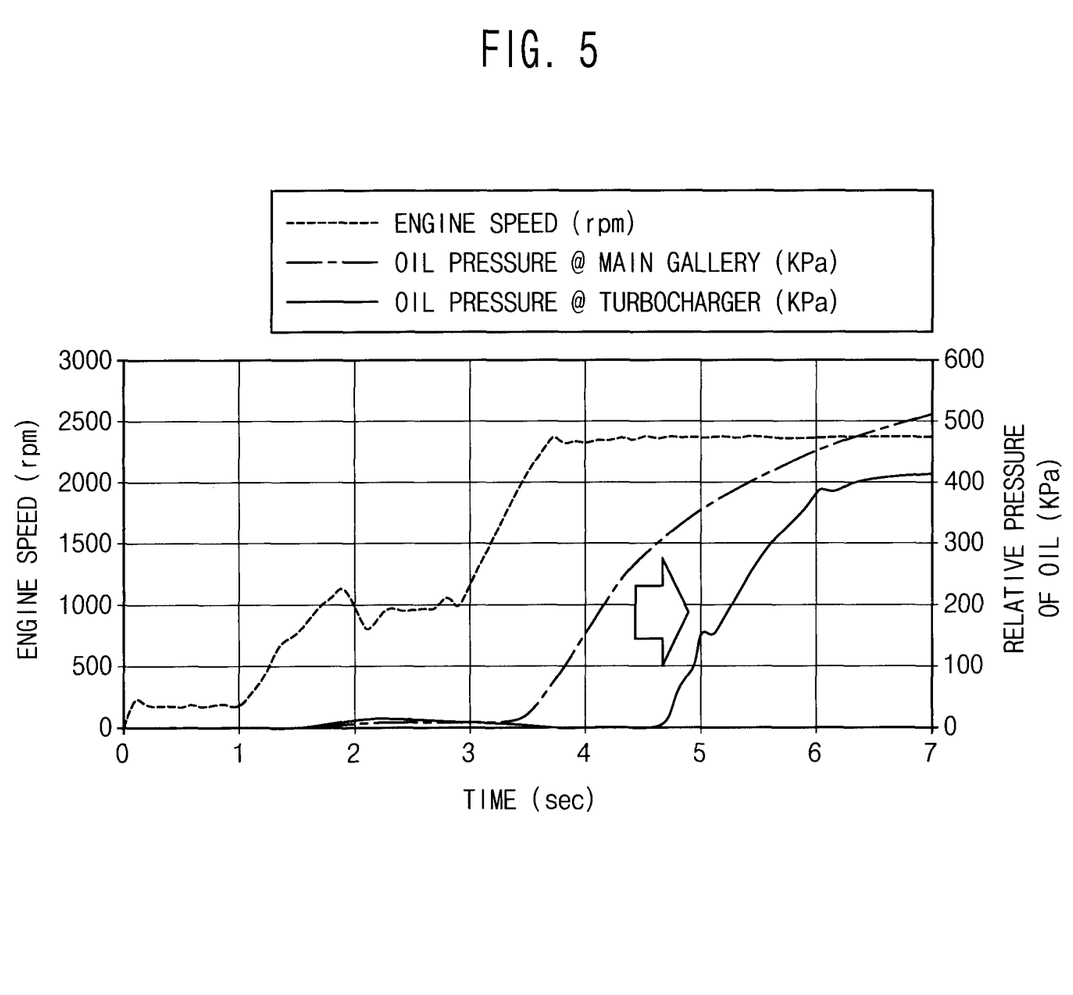
FIG. 5 is a graph illustrating a simulation model of an oil pressure in a turbocharger, which is performed by the anticipator in FIG. 4.
Figure 6:
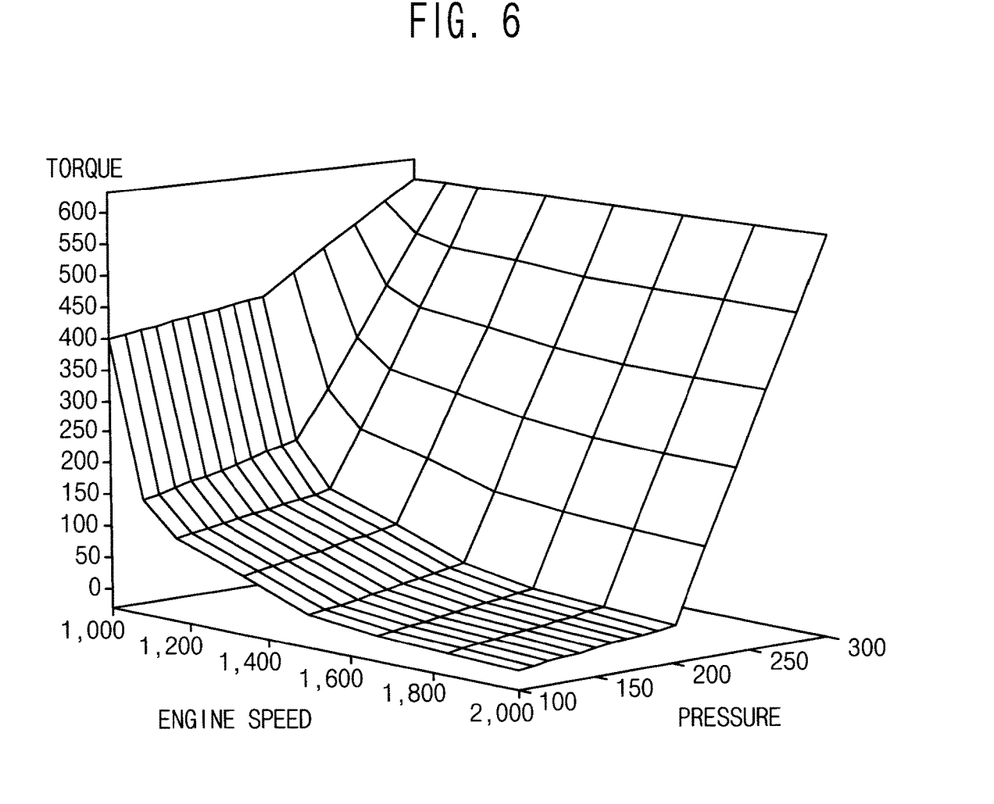
FIG. 6 is a graph illustrating an engine torque limit map with respect to an oil pressure stored in the second calculator in FIG. 4.
Figure 7:
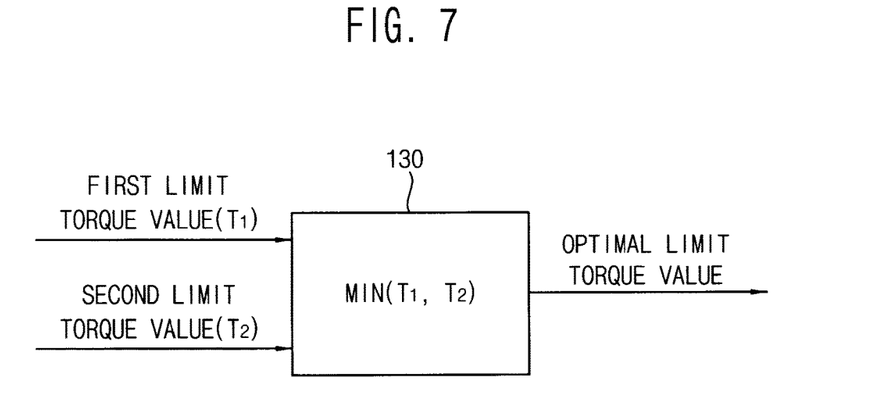
FIG. 7 is a block diagram illustrating a determiner in FIG. 1.

FIG. 1 is a block diagram illustrating an engine control device in accordance with example embodiments. FIG. 2 is a block diagram illustrating a first calculator in FIG. 1. FIG. 3 is a graph illustrating an engine torque limit map with respect to an oil temperature stored in the first calculator in FIG. 2. FIG. 4 is a block diagram illustrating an anticipator and a second calculator in FIG. 1. FIG. 5 is a graph illustrating a simulation model of an oil pressure in a turbocharger, which is performed by the anticipator in FIG. 4. FIG. 6 is a graph illustrating an engine torque limit map with respect to an oil pressure stored in the second calculator in FIG. 4. FIG. 7 is a block diagram illustrating a determiner in FIG. 1.

Referring to FIGS. 1 to 7, an engine control apparatus may include a temperature sensor 10 configured to detect engine-related temperature information, an oil pressure sensor 20 configured to detect a pressure of engine oil, and a control unit 100 configured to control an engine such that an engine output is limited to an optimal limit output value of the engine determined using the temperature information and the oil pressure.

The control unit 100 may include a first calculator 110 configured to calculate a first limit output value of the engine based on the temperature information inputted from the temperature sensor 10, a second calculator 120 configured to calculate a second limit output value of the engine based on the oil pressure inputted from the oil pressure sensor 20, and a determiner 130 configured to determine one of the first and second limit output values inputted from the first and second calculators as the optimal limit output value of the engine.

In example embodiments, the control unit 100 may output a command signal representing the optical limit output value of the engine to an engine controller 200, and the engine controller 200 may control an engine torque or an engine speed of the engine 300 in response to the command signal.

The temperature sensor 10 may detect the engine-related temperature information. The detected temperature information may be transmitted to the first calculator 110.

In example embodiments, the engine-related temperature information may include at least one of an engine oil temperature, an engine block temperature and an engine cooling water temperature.

For example, the temperature sensor 10 may be installed in an oil main gallery to detect the engine oil temperature in the oil main gallery and transmit to the first calculator 110.

Alternatively, the temperature sensor 10 may be installed in a cylinder head to detect the engine cooling water temperature and transmit to the first calculator 110.

The pressure sensor 20 may detect the pressure of the engine oil and may transmit the detected pressure value to the second calculator 120.

For example, the pressure sensor 20 may be installed in the oil main gallery to detect the engine oil pressure and transmit to the second calculator 120.

As illustrated in FIGS. 2 and 3, the first calculator 110 may receive the engine-related temperature information from the temperature sensor 10 and may calculate a first limit torque value $T_1$ of the engine based on the temperature information.

In example embodiments, the first calculator 110 may receive the engine oil temperature detected in the oil main gallery. The first calculator 110 may use an engine torque limit map for the oil temperature to calculate an engine speed-limit torque value $T_1$ with respect to the oil temperature.

For example, the first calculator 110 may receive a current temperature of the engine oil detected by the temperature sensor 10 installed in the oil main gallery and may receive an engine speed according to an accelerator pedal position determined by a user. When the oil temperature and the engine speed are inputted, the first limit torque value $T_1$ of the engine may be calculated using the engine torque limit map as illustrated in FIG. 3.

Alternatively, the first calculator 110 may receive a current temperature of an engine cooling water from the cooling water temperature sensor 10 installed in a cylinder head, not the oil main gallery, and may receive an engine speed according to an accelerator pedal position determined by a user. When the cooling water temperature and the engine speed are inputted, the first limit torque value $T_1$ of the engine may be calculated using the engine torque limit map as illustrated in FIG. 3.

Moving parts such as turbocharger may require cooling and lubrication with the engine oil. Above all, the cooling may be performed by the cooling water as well as the engine oil. Accordingly, the engine control apparatus may limit the maximum output of the engine until a sufficient quantity of the cooling water is supplied, to thereby prevent a breakdown of the moving part such as turbocharger.

As illustrated in FIGS. 4 to 6, the second calculator 120 may receive an oil pressure of the engine oil detected by the pressure sensor 20 and may calculate a second limit torque value $T_2$ of the engine based on the oil pressure of the engine oil.

In example embodiments, the second calculator 120 may receive the oil pressure in the oil main gallery. For example, the pressure sensor 20 may be installed in the oil main gallery, and the second calculator 120 may receive the engine oil pressure in the oil main gallery from the pressure sensor.

Alternatively, the second calculator 120 may receive the engine oil pressure in the turbocharger. For example, the pressure sensor 20 may be installed in the turbocharger, and the second calculator 120 may receive the engine oil pressure in the turbocharger from the pressure sensor.

In example embodiments, the second calculator 120 may use an engine torque limit map for the oil pressure to calculate an engine speed-limit torque value $T_2$ with respect to the oil pressure.

For example, the second calculator 120 may receive a current pressure of the engine oil detected by the pressure sensor 20 installed in the oil main gallery and may receive an engine speed according to an accelerator pedal position determined by a user. When the oil pressure and the engine speed are inputted, the second limit torque value $T_2$ of the engine may be calculated using the engine torque limit map as illustrated in FIG. 6.

In example embodiments, the engine control apparatus may further include an anticipator 122 configured to predict an oil pressure in the turbocharger based on the inputted oil pressure. In this case, the second calculator 120 may calculate the second limit torque value $T_2$ based on the predicted oil pressure in the turbocharger.

In an internal combustion engine, oil may be supplied from an oil pan to a main gallery by an oil pump, and then, may be supplied to the moving parts such as the turbocharger, while maintaining the oil pressure at the main gallery a constant pressure is maintained in the main gallery. Accordingly, an oil pressure in the turbocharger at any given instant may be different from an oil pressure in the main gallery, and the oil pressure in the turbocharger may be increased more slowly than that in the main gallery. That is, in order to prevent the breakdown of the turbocharger due to a lack of the oil, it may be preferable that the output of the engine may be limited by using the oil pressure in the turbocharger instead of that in the main gallery. The anticipator 122 may predict the oil pressure in the turbocharger based on the oil pressure in the main gallery. Accordingly, the second calculator 120 may receive the predicted oil pressure in the turbocharger and calculate the second limit torque value $T_2$ of the engine.

In example embodiments, the anticipator 122 may receive the oil pressure value from the pressure sensor 20 in stalled in the oil main gallery and may delay the received oil pressure value by a predetermined time to simulate the oil pressure in the turbocharger.

Referring to FIG. 5, after a user starts an engine, an engine speed may be determined according to an accelerator pedal position. Then, as oil is supplied from an oil pan to an oil main gallery by an oil pump, an oil pressure may be formed and increased to a certain pressure value in the oil main gallery. The anticipator 122 may receive the oil pressure value in the oil main gallery and may delay the received oil pressure value by a predetermined time to simulate an oil pressure in the turbocharger.

For example, the anticipator 122 may receive a signal representing an oil pressure value detected by the oil pressure sensor which is installed in the oil main gallery, and may process the signal representing the oil pressure value of the oil main gallery through a low-pass filer to simulate a signal representing an oil pressure in the turbocharger. In this case, the signal representing the oil pressure value of the oil main gallery may be delayed by a predetermined low pass filer value to determine the oil pressure value in the turbocharger.

As illustrated in FIG. 7, the determiner 130 may receive the first limit output value and the second limit output value and may determine the minimum value of the first and second limit output values as the optimal output value. That is, the optimal output value may be determined as MIN($T_1$, $T_2$). The optical output value may be an optical limit output value of the engine in order to limit an engine torque, an engine speed, etc.

The optimal limit output value determined by the determiner 130 may be outputted to the engine controller 200.

The engine controller 200 may control an output of the engine 300 in response to the inputted optimal limit output value as a control signal.

As mentioned above, the engine control apparatus may control the engine torque or the engine speed in consideration of the oil temperature of the engine oil as well as the oil pressure. Thus, even though a user starts an engine and accelerates rapidly, the output of the engine may be limited to increase smoothly until the oil is supplied sufficiently to the moving parts.

Additionally, in order to protect the moving parts such as the turbocharger which tends to be strongly affected by the supply of the oil, the oil pressure value of the engine oil detected in the oil main gallery may be used to predict the oil pressure value in the turbocharger, and the output value of the engine may be limited optimally according to the predicted oil pressure value in the turbocharger, to thereby prevent the breakdown of the turbocharger due to the lack of the engine oil.

Hereinafter, a method of controlling an engine using the engine control apparatus will be explained.

Figure 8:
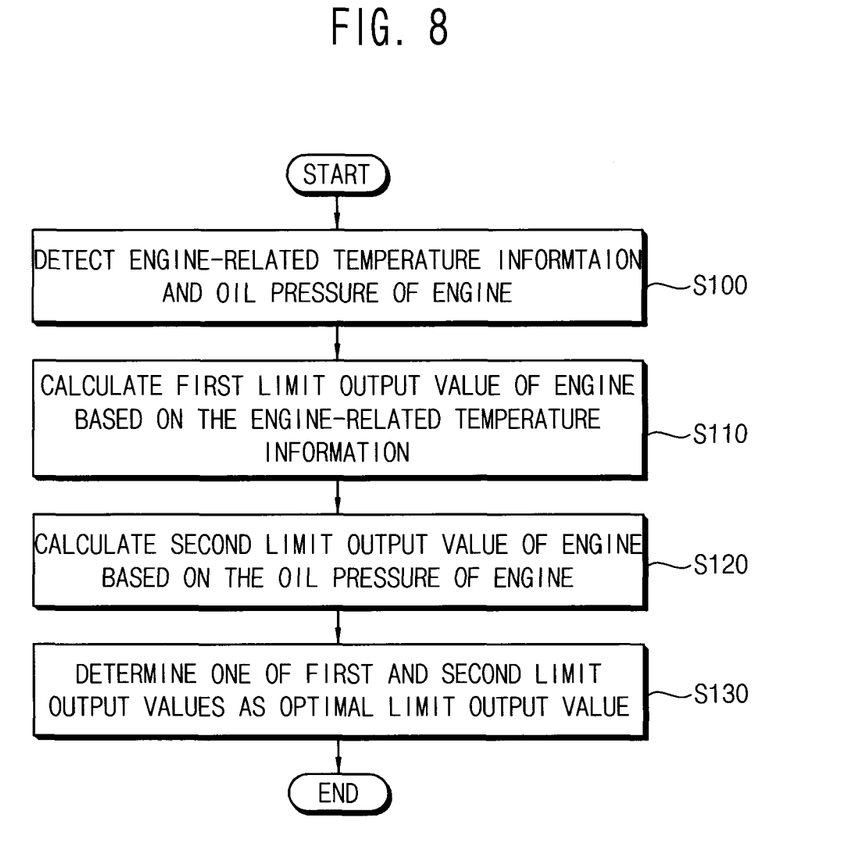
FIG. 8 is a flow chart illustrating an engine control method in accordance with example embodiments.

FIG. 8 is a flow chart illustrating an engine control method in accordance with example embodiments.

Referring to FIG. 8, engine-related temperature information and an engine oil pressure may be detected (S100).

In example embodiments, the engine-related temperature information and an engine oil pressure may be an oil temperature and an oil pressure in an oil main gallery respectively. The oil temperature and the oil pressure may be detected in a temperature sensor 10 and a pressure sensor 20 installed in the oil main gallery respectively.

Alternatively, the engine-related temperature information may be an engine cooling water temperature, and the engine oil pressure may include the oil pressure detected in the oil main gallery. The cooling water temperature may be detected by the cooling water temperature sensor 10 installed in a cylinder head, and the oil pressure may be detected by the pressure sensor 20.

Then, a first limit output value may be calculated based on the inputted oil temperature of the engine oil (S110).

In example embodiments, the engine-related temperature information may be received from the temperature sensor 10, and an engine torque limit map with respect to the engine-related temperature information as illustrated in FIG. 3, may be used to calculate an engine speed-limit torque value with respect to the engine-related temperature as the first limit output value. In this case, the engine speed may be determined according to an accelerator pedal position determined by a user.

Then, a second limit output value may be calculated based on the inputted oil pressure of the engine oil (S120).

In example embodiments, the oil pressure value of the engine oil may be received from the engine oil pressure sensor 20, and an engine torque limit map with respect to the oil pressure as illustrated in FIG. 6, may be used to calculate an engine speed-limit torque value with respect to the oil pressure as the second limit output value. In this case, the engine speed may be determined according to an accelerator pedal position determined by a user.

In example embodiments, when the second limit output value is calculated, an oil pressure in a turbocharger may be predicted from the oil pressure and the predicted oil pressure in the turbocharger may be used to calculate the second limit output value.

The engine oil of an internal combustion engine may be supplied to the main gallery, and then, may be supplied to moving parts which require the engine oil. Accordingly, an oil pressure in the moving part such as a turbocharger at any given instant may be different from the oil pressure in the main gallery, and the oil pressure in the turbocharger may be formed to be increased more slowly than that in the main gallery. Thus, in order to prevent a breakdown of the turbocharger due to a lack of the oil, it may be preferable that the output of the engine may be limited by using the oil pressure in the turbocharger instead of that in the main gallery.

In example embodiments, when the second limit output value is calculated, the detect oil pressure value may be delayed by a predetermined time.

For example, a signal representing the oil pressure value detected by the oil pressure sensor 20 which is installed in the oil main gallery may be received, and the signal representing the oil pressure value of the oil main gallery may be passed through a low-pass filer to be simulated as a signal representing an oil pressure in the turbocharger. In this case, the signal representing the oil pressure value of the oil main gallery may be delayed by a predetermined low pass filer value to be transformed into the signal representing the oil pressure value in the turbocharger.

Then, an engine torque limit map with respect to the oil pressure as illustrated in FIG. 6 may be used to calculate an engine speed-limit torque value with respect to the oil pressure as the second limit output value. In this case, the engine speed may be determined according to an accelerator pedal position determined by a user.

Then, one of the first and second limit output values may be determined as an optimal limit output value (S130).

In example embodiments, the first limit output value and the second limit output value may be received and then the minimum value of the first and second limit output values may be determined as the optimal output value.

The determined optimal limit output value may be outputted to an engine controller 200. The engine controller 200 may control an output of an engine 300 in response to the inputted optimal limit output value as a control signal.

As mentioned above, in the engine control method, an engine torque or an engine speed may be controlled in consideration of the engine-related temperature information as well as the oil pressure. Thus, even though a user starts an engine and accelerates rapidly, the output of the engine may be limited to increase smoothly until the oil and the cooling water are supplied sufficiently to the moving parts.

Additionally, in order to protect the moving parts such as the turbocharger which tends to be strongly affected by the supply of the oil, the oil pressure value of the engine oil detected in the oil main gallery may be used to predict the oil pressure value in the turbocharger, and the output value of the engine may be limited optimally according to the predicted oil pressure value in the turbocharger, to thereby prevent the breakdown of the turbocharger due to the lack of the engine oil.

The foregoing is illustrative of example embodiments of the invention and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims.

| * Description of Reference numerals | |
|---|---|
| 10: temperature sensor | 20: pressure sensor |
| 100: control unit | 110: first calculator |
| 120: second calculator | 122: anticipator |
| 130: determiner | 200: engine controller |
| 300: engine | |

What is claimed is:

1. An engine control apparatus, comprising:
a temperature sensor configured to detect engine-related temperature information;
a first calculator configured to calculate a first limit output value of an engine based on the engine-related temperature information inputted from the temperature sensor;
an oil pressure sensor configured to detect an oil pressure value of the engine;
a second calculator configured to calculate a second limit output value of the engine based on the oil pressure value inputted from the oil pressure sensor;
a determiner configured to determine one of the first and second limit output values inputted from the first and second calculators as an optimal limit output value of the engine; and
an engine controller configured to control an output of the engine in response to the optimal limit output value,
wherein the second calculator receives an engine oil pressure value detected in a turbocharger.

2. The engine control apparatus of claim 1, wherein the engine-related temperature information comprises at least one of an engine oil temperature, an engine block temperature and an engine cooling water temperature.

3. The engine control apparatus of claim 2, wherein the first calculator receives the engine oil temperature detected in an oil main gallery.

4. The engine control apparatus of claim 1, wherein the first calculator uses an engine torque limit map for the engine-related temperature information to calculate an engine speed-limit torque value with respect to the engine-related temperature information.

5. The engine control apparatus of claim 1, wherein the second calculator uses an engine torque limit map for the oil pressure value to calculate an engine speed-limit torque value with respect to the oil pressure value.

6. An engine control apparatus, comprising:
a temperature sensor configured to detect engine-related temperature information;
a first calculator configured to calculate a first limit output value of an engine based on the engine-related temperature information inputted from the temperature sensor;
an oil pressure sensor configured to detect an oil pressure value of the engine;
an anticipator configured to predict an oil pressure in the turbocharger based on the oil pressure value;
a second calculator configured to calculate a second limit output value of the engine based on the predicted oil pressure value in the turbocharger;
a determiner configured to determine one of the first and second limit output values inputted from the first and second calculators as an optimal limit output value of the engine; and
an engine controller configured to control an output of the engine in response to the optimal limit output value.

7. The engine control apparatus of claim 6, wherein
the second calculator delays the inputted oil pressure value by a predetermined time to calculate the second limit output value of the engine, and
the engine oil pressure value detected by the oil pressure sensor is an engine oil pressure value in an oil main gallery.

8. The engine control apparatus of claim 1, wherein the determiner determines a minimum value of the first and second limit output values as the optimal output value.

9. An engine control method, comprising:
detecting engine-related temperature information;
calculating a first limit output value of an engine based on the engine-related temperature information;
detecting an oil pressure value of the engine;
calculating a second limit output value of the engine based on the oil pressure value;
determining one of the first and second limit output values as an optimal limit output value of the engine; and
controlling an output of the engine in response to the optimal limit output value,
wherein detecting the oil pressure value of the engine comprises detecting an engine oil pressure value in a turbocharger.

10. The engine control method of claim 9, wherein calculating the second limit output value comprising delaying the detected oil pressure value by a predetermined time.

11. The engine control method of claim 9, wherein detecting the engine-related temperature information comprises at least one of detecting an engine oil temperature, detecting an engine block temperature and detecting an engine cooling water temperature.

12. The engine control method of claim 9, wherein calculating the first limit output value comprises using an engine torque limit map for the engine-related temperature information to calculate an engine speed-limit torque value with respect to the engine-related temperature information.

13. The engine control method of claim 9, wherein calculating the second limit output value comprises using an engine torque limit map for the oil pressure value to calculate an engine speed-limit torque value with respect to the oil pressure value.

14. An engine control method, comprising:
detecting engine-related temperature information;
calculating a first limit output value of an engine based on the engine-related temperature information;
detecting an oil pressure value of the engine;
predicting an oil pressure value in the turbocharger based on the detected oil pressure value;
calculating a second limit output value of the engine based on the predicted oil pressure value in the turbocharger;
determining one of the first and second limit output values as an optimal limit output value of the engine; and
controlling an output of the engine in response to the optimal limit output value.

* * * * *